United States Patent
Lu et al.

(10) Patent No.: US 11,323,681 B2
(45) Date of Patent: May 3, 2022

(54) 3D DISPLAY DEVICE AND WORKING METHOD THEREOF

(71) Applicant: BOE TECHNOLOGY GROUP CO., LTD., Beijing (CN)

(72) Inventors: Pengcheng Lu, Beijing (CN); Xiaochuan Chen, Beijing (CN); Shengji Yang, Beijing (CN); Lei Wang, Beijing (CN); Wenqing Zhao, Beijing (CN); Dongni Liu, Beijing (CN); Jie Fu, Beijing (CN); Han Yue, Beijing (CN); Li Xiao, Beijing (CN); Jian Gao, Beijing (CN); Haisheng Wang, Beijing (CN); Changfeng Li, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 1016 days.

(21) Appl. No.: 15/778,375

(22) PCT Filed: Sep. 29, 2017

(86) PCT No.: PCT/CN2017/104362
§ 371 (c)(1),
(2) Date: May 23, 2018

(87) PCT Pub. No.: WO2018/141161
PCT Pub. Date: Aug. 9, 2018

(65) Prior Publication Data
US 2021/0211628 A1    Jul. 8, 2021

(30) Foreign Application Priority Data

Feb. 6, 2017  (CN) .......................... 201710065575.5

(51) Int. Cl.
*H04N 13/117* (2018.01)
*H04N 13/322* (2018.01)
(Continued)

(52) U.S. Cl.
CPC ......... *H04N 13/117* (2018.05); *G09G 3/3607* (2013.01); *H04N 13/31* (2018.05); *H04N 13/322* (2018.05); *H04N 13/383* (2018.05)

(58) Field of Classification Search
CPC .. H04N 13/117; H04N 13/322; H04N 13/383; H04N 13/31; G09G 3/3607
(Continued)

(56) References Cited

U.S. PATENT DOCUMENTS

| | | | | |
|---|---|---|---|---|
| 2012/0120203 | A1* | 5/2012 | Chen | H04N 13/122 348/51 |
| 2013/0321493 | A1* | 12/2013 | Sone | H04N 13/183 345/690 |
| 2015/0029425 | A1 | 1/2015 | Tseng | |

FOREIGN PATENT DOCUMENTS

| | | |
|---|---|---|
| CN | 1936657 A | 3/2007 |
| CN | 101909219 A | 12/2010 |

(Continued)

OTHER PUBLICATIONS

International search report dated Dec. 26, 2017 for corresponding application PCT/CN2017/104362 with English translation attached.
Chinese office action dated Sep. 26, 2018 for corresponding application No. 201710065575.5 with English translation attached.

*Primary Examiner* — Clifford Hilaire
*Assistant Examiner* — Kristin Dobbs
(74) *Attorney, Agent, or Firm* — Nath, Goldberg & Meyer; Joshua B. Goldberg

(57) ABSTRACT

The present disclosure provides a 3D display device and a working method of the same, the 3D display device includes a display panel, a lens unit, an acquiring component and an adjusting component, the acquiring component is configured to acquire current positions of eyes of a viewer, and the adjusting component is configured to adjust a signal for driving the display panel according to the current positions so that display information of the display panel received by (Continued)

the eyes of the viewer at the current positions is the same as display information of the display panel received by the eyes of the viewer at preset positions.

6 Claims, 4 Drawing Sheets

(51) Int. Cl.
  *H04N 13/383* (2018.01)
  *H04N 13/31* (2018.01)
  *G09G 3/36* (2006.01)
(58) Field of Classification Search
  USPC .......................................................... 348/51
  See application file for complete search history.

(56) References Cited

FOREIGN PATENT DOCUMENTS

| | | | |
|---|---|---|---|
| CN | 101984670 | A | 3/2011 |
| CN | 102098524 | A | 6/2011 |
| CN | 102497570 | A | 6/2012 |
| CN | 102802001 | A | 11/2012 |
| CN | 102821294 | A | 12/2012 |
| CN | 102868894 | A | 1/2013 |
| CN | 204887281 | U | 12/2015 |
| CN | 106526877 | A | 3/2017 |
| CN | 106773091 | A | 5/2017 |
| CN | 106817511 | A | 6/2017 |

\* cited by examiner

3D DISPLAY DEVICE AND WORKING METHOD THEREOF

CROSS-REFERENCE TO RELATED APPLICATION

This is a National Phase application filed under 35 U.S.C. 371 as a national stage of PCT/CN2017/104362, filed Sep. 29, 2017, an application claiming priority to Chinese Patent Application No. 201710065575.5 filed on Feb. 6, 2017, entitled "3D display device and working method thereof", the disclosure of which is hereby incorporated by reference in its entirety.

TECHNICAL FIELD

The present disclosure relates to the field of display technology, and particularly relates to a 3D display device and a working method of a 3D display device.

BACKGROUND

A main principle of a 3D display technology is that, left and right eyes of a viewer receive different images respectively, and the images for the left and right eyes are analyzed and overlapped by brain of the viewer so that the viewer perceives layering of the images, thereby the viewer gets a stereo perception. Currently, 3D display devices are divided into two types: one type includes display devices which require viewers to wear 3D glasses to watch; the other type includes auto-stereoscopic (i.e., naked-eye) 3D display devices. Parallax barrier is a naked-eye 3D display technology, which controls a voltage difference between electrodes of an upper substrate and a lower substrate of a liquid crystal lens so that liquid crystal molecules in a liquid crystal layer rotate, and finally opaque strips are formed, that is, a parallax barrier is formed.

SUMMARY

As an aspect, the present disclosure provides a 3D display device including a display panel, a lens unit, an acquiring component and an adjusting component, the lens unit is provided on a light exiting surface of the display panel, the acquiring component is coupled between the adjusting component and the lens unit, the adjusting component is coupled to the display panel, the lens unit is configured to form a left eye parallax image corresponding to a left eye and a right eye parallax image corresponding to a right eye, the acquiring component is configured to acquire current positions of eyes of a viewer, the adjusting component is configured to adjust a signal for driving the display panel according to the current positions so that display information of the display panel received by the eyes of the viewer at the current positions is the same as display information of the display panel received by the eyes of the viewer at preset positions.

In some implementations, the display information includes gray scale information.

In some implementations, the adjusting component is further configured to adjust a gray scale voltage of a monochromatic sub-pixel according to the current positions, so that display information of the monochromatic sub-pixel received by the eyes of the viewer at the current positions is the same as display information of the monochromatic sub-pixel received by the eyes of the viewer at the preset positions.

In some implementations, the adjusting component includes a pre-storage element, a lookup element and an adjusting element, the pre-storage element is configured to store a correspondence relationship among pre-detected different positions of the eyes of the viewer, gray scale voltages of the monochromatic sub-pixel and display information received by the eyes of the viewer, the lookup element is configured to look up a corresponding gray scale voltage according to the current positions of the eyes of the viewer and the display information received by the eyes of the viewer, and transfer the corresponding gray scale voltage to the adjusting element, the adjusting element is configured to apply the corresponding gray scale voltage to the monochromatic sub-pixel.

In some implementations, the adjusting component includes a first adjusting element, a second adjusting element and a third adjusting element, the first adjusting element is configured to adjust the gray scale voltage of a red sub-pixel according to the current positions so that the display information of the red sub-pixel received by the eyes of the viewer at the current positions is the same as the display information of the red sub-pixel received by the eyes of the viewer at the preset positions, the second adjusting element is configured to adjust the gray scale voltage of a green sub-pixel according to the current positions so that the display information of the green sub-pixel received by the eyes of the viewer at the current positions is the same as the display information of the green sub-pixel received by the eyes of the viewer at the preset positions, the third adjusting element is configured to adjust the gray scale voltage of a blue sub-pixel according to the current positions so that the display information of the blue sub-pixel received by the eyes of the viewer at the current positions is the same as the display information of the blue sub-pixel received by the eyes of the viewer at the preset positions.

In some implementations, the lens unit includes any of a liquid crystal lens, a fixed lens and a lens film.

In some implementations, the acquiring component includes a position detector, and the adjusting component includes a signal processor.

As another aspect, the present disclosure provides a working method of a 3D display device, the 3D display device includes a display panel, a lens unit, an acquiring component and an adjusting component, the lens unit is provided on a light exiting surface of the display panel, the acquiring component is coupled between the adjusting component and the lens unit, and the adjusting component is coupled to the display panel, the working method of the 3D display device including steps of: forming, by a lens unit, a left eye parallax image corresponding to a left eye and a right eye parallax image corresponding to a right eye; acquiring, by the acquiring component, current positions of eyes of a viewer; adjusting, by the adjusting component, a signal for driving the display panel according to the current positions so that display information of the display panel received by the eyes of the viewer at the current positions is the same as display information of the display panel received by the eyes of the viewer at preset positions.

In some implementations, the display information includes gray scale information.

In some implementations, the step of adjusting, by the adjusting component, the signal for driving the display panel according to the current positions includes a step of: adjusting, by the adjusting component, a gray scale voltage of a monochromatic sub-pixel according to the current positions so that the display information of the monochromatic sub-pixel received by the eyes of the viewer at the current positions is the same as the display information of the monochromatic sub-pixel received by the eyes of the viewer at the preset positions.

In some implementations, the adjusting component includes a pre-storage element, a lookup element and an adjusting element, the step of adjusting, by the adjusting component, the gray scale voltage of the monochromatic sub-pixel according to the current positions includes: storing, by the pre-storage element, a correspondence relationship among pre-detected different positions of the eyes of the viewer, gray scale voltages of the monochromatic sub-pixel and display information received by the eyes of the viewer; looking up, by the lookup element, a corresponding gray scale voltage according to the current positions of the eyes of the viewer and the display information received by the eyes of the viewer, and transferring the gray scale voltage to the adjusting element; applying, by the adjusting element, the gray scale voltage to the monochromatic sub-pixel.

In some implementations, the adjusting component includes a first adjusting element, a second adjusting element and a third adjusting element, the step of adjusting, by the adjusting component, the gray scale voltage of the monochromatic sub-pixel according to the current positions includes: adjusting, by the first adjusting element, the gray scale voltage of a red sub-pixel according to the current positions so that the display information of the red sub-pixel received by the eyes of the viewer at the current positions is the same as the display information of the red sub-pixel received by the eyes of the viewer at the preset positions; adjusting, by the second adjusting element, the gray scale voltage of a green sub-pixel according to the current positions so that the display information of the green sub-pixel received by the eyes of the viewer at the current positions is the same as the display information of the green sub-pixel received by the eyes of the viewer at the preset positions; and adjusting, by the third adjusting element, the gray scale voltage of a blue sub-pixel according to the current positions so that the display information of the blue sub-pixel received by the eyes of the viewer at the current positions is the same as the display information of the blue sub-pixel received by the eyes of the viewer at the preset positions.

DETAILED DESCRIPTION

In order to make persons skilled in the art understand technical solutions of the present disclosure better, the 3D display device and the working method of the 3D display device provided by the present disclosure will be described in detail below in conjunction with drawings.

Figure 1:
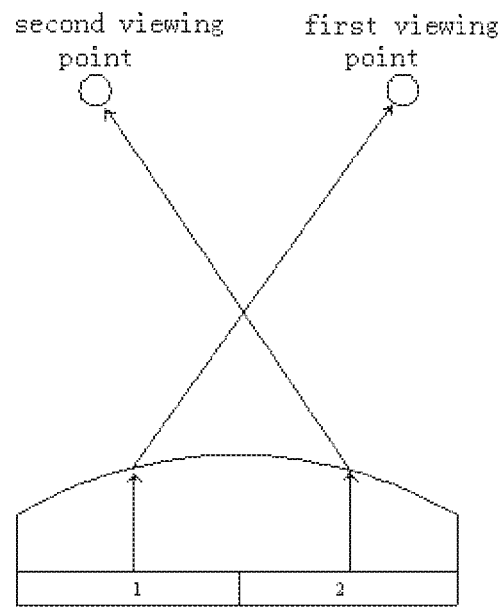
FIG. 1 is a schematic diagram of light path in a case where eyes of a viewer watch a 3D display device from optimal viewing positions.
Figure 2:
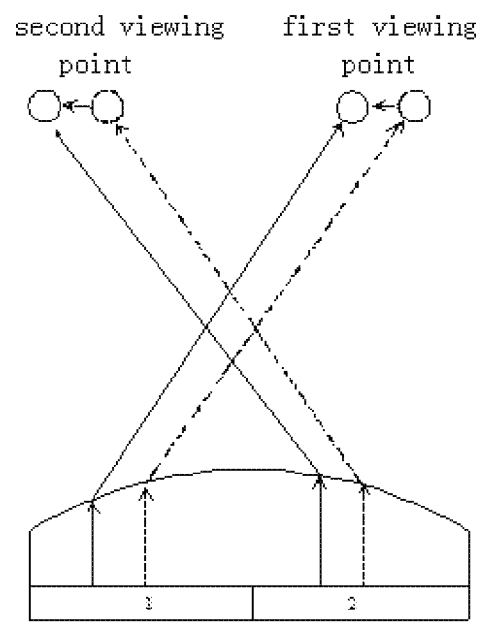
FIG. 2 is a schematic diagram of light path in a case where eyes of a viewer watch a 3D display device from positions deviating from optimal viewing positions.

FIG. 1 is a schematic diagram of light path in a case where eyes of a viewer watch a 3D display device from optimal viewing positions. As shown in FIG. 1, light of a pixel 1 is incident to an optimal viewing point 1, and light of a pixel 2 is incident to an optimal viewing point 2, so that an optimal 3D picture is formed in the eyes of the viewer. FIG. 2 is a schematic diagram of light path in a case where eyes of a viewer watch a 3D display device from positions deviating from optimal viewing positions. As shown in FIG. 2, dotted lines indicate the optimal viewing positions, and in a case where the eyes of the viewer deviate from the optimal viewing positions, since a curvature of a lens in the 3D display device is fixed, the viewer will see significant picture flutter, thus visual experiences provided by the naked-eye 3D display device is affected seriously.

Figure 3:
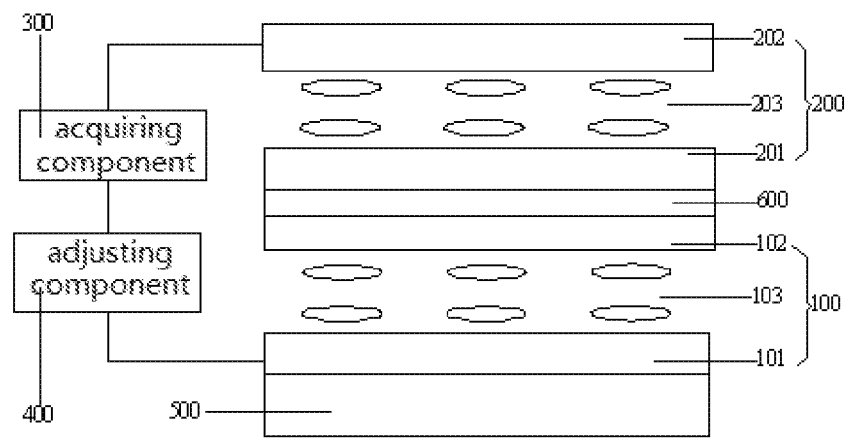
FIG. 3 is a structural diagram of a 3D display device in an embodiment of the present disclosure.

FIG. 3 shows a structural diagram of a 3D display device in an embodiment of the present disclosure. As shown in FIG. 3, the 3D display device includes a display panel 100, a lens unit 200, an acquiring component 300 and an adjusting component 400, the lens unit 200 is provided on a light exiting surface of the display panel 100, optically clear adhesive (OCA) is provided between the lens unit 200 and the display panel 100, the lens unit 200 includes any of a liquid crystal lens, a fixed lens and a lens film. In some implementations, the lens unit 200 can be directly provided on the display panel 100, that is, the lens unit 200 and the display panel 100 share a single substrate.

In the embodiment, the 3D display device further includes a backlight assembly 500, and the backlight assembly 500 is provided on a light incident surface of the display panel 100. In some implementations, the display panel 100 includes a first substrate 101, a first liquid crystal layer 103 and a second substrate 102, the first liquid crystal layer 103 is provided between the first substrate 101 and the second substrate 102, and the second substrate 102 is proximal to the optically clear adhesive 600. The lens unit 200 includes a third substrate 201, a second liquid crystal layer 203 and a fourth substrate 202, the second liquid crystal layer 203 is provided between the third substrate 201 and the fourth substrate 202, and the third substrate 201 is proximal to the optically clear adhesive 600.

As shown in FIG. 3, the acquiring component 300 is coupled to the adjusting component 400 and the lens unit 200 respectively, and the adjusting component 400 is coupled to the display panel 100. The item of "coupled" or its any equivalent replacement in the present disclosure means there exists a transmission of an electrical signal existing among/between components related thereto. The backlight assembly 500 provides a light source to the display panel 100, the display panel 100 emits display light, the lens unit 20 transfer a left eye parallax image to a left eye and a right eye parallax image to a right eye, the acquiring component 300 acquires current positions of eyes of a viewer, the adjusting component 400 adjusts a signal for driving the display panel according to the current positions so that display information of the display panel received by the eyes of the viewer at the current positions is the same as display information of the display panel received by the eyes of the viewer at preset positions. In the embodiment, the acquiring component 300 can be implemented by a position detector such as an eye tracker, and the adjusting component 400 can be implemented by a signal processor, the eye tracker tracks positions of the eyes of the viewer in real time and feeds back the positions of the eyes of the viewer to the signal processor, the signal processor adjusts the signal for driving the display panel in real time according to the positions of the eyes of the viewer. With the technical solution of the embodiment, it is not required to change the morphology of the lens, and the positions of the eyes of the viewer are acquired, then the signal for driving the display panel is adjusted according to the positions of the eyes of the viewer so that the display information of the display panel received by the eyes of the viewer at the current positions is the same as the display information of the display panel received by the eyes of the viewer at the optimal positions (in a case where the eyes of the viewer are at the optimal positions, the eyes of the viewer can receive the optimal 3D display picture without adjusting of the adjusting component), and finally the viewer can see a continuous and smooth naked-eye 3D picture even during moving of the eyes of the viewer, resulting in improved visual experiences.

Figure 4:
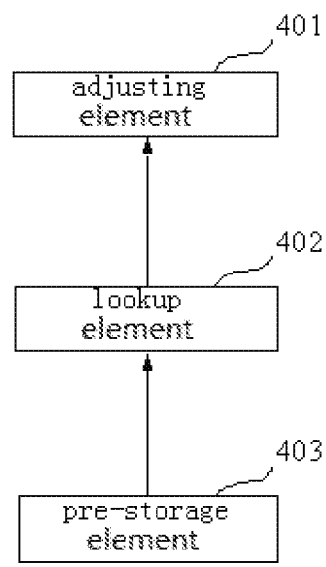
FIG. 4 is a structural diagram of an adjusting component in an embodiment of the present disclosure.

In the embodiment, the display information includes gray scale information. The adjusting component 400 adjusts a gray scale voltage of a monochromatic sub-pixel according to the current positions, so that display information of the monochromatic sub-pixel received by the eyes of the viewer at the current positions is the same as display information of the monochromatic sub-pixel received by the eyes of the viewer at the preset positions. In the embodiment, the preset positions are positions that the eyes of the viewer can reach, for example, the preset positions can be positions at which the eyes of the viewer can receive the optimal 3D display picture. FIG. 4 is a structural diagram of the adjusting component in the embodiment of the present disclosure. As shown in FIG. 4, the adjusting component includes a pre-storage element 403, a lookup element 402 and an adjusting element 401, the pre-storage element 403 stores a correspondence relationship among pre-detected different positions of the eyes of the viewer, gray scale voltages of the monochromatic sub-pixel and display information received by the eyes of the viewer, the lookup element 402 looks up a corresponding gray scale voltage according to the current positions of the eyes of the viewer and the display information received by the eyes of the viewer, and transfers the gray scale voltage to the adjusting element, the adjusting element 401 applies the gray scale voltage to the monochromatic sub-pixel. Thus, in the embodiment, the positions of the eyes of the viewer, the gray scale voltage of the monochromatic sub-pixel and the display information received by the eyes of the viewer are pre-detected so that the correspondence relationship among them is established, and the pre-storage component 403 stores the correspondence relationship. In a case where the positions of the eyes of the viewer are detected in real time, the lookup element 402 looks up the corresponding gray scale voltage according to the positions of the eyes of the viewer and the display information received by the eyes of the viewer, and the adjusting element 401 applies the gray scale voltage to the monochromatic sub-pixel so as to realize the function of the adjusting component 400, thereby it is ensured that the display information of the monochromatic sub-pixel received by the eyes of the viewer at the current positions is the same as the display information of the monochromatic sub-pixel received by the eyes of the viewer at previous positions.

In the embodiment, the pre-storage component 403 can be implemented by a memory in any form, such as nonvolatile memory and flash memory, the lookup element 402 can be implemented by a processor which can obtain the gray scale voltage of the monochromatic sub-pixel according to the correspondence relationship, stored in the pre-storage component 403, among the positions of the eyes of the viewer, the gray scale voltages of the monochromatic sub-pixel and the display information received by the eyes of the viewer in a case where the positions of the eyes of the viewer and the display information received by the eyes of the viewer are known, and the adjusting element 401 can be implemented by a driving circuit which can apply the gray scale voltage obtained by the lookup element 403 to the corresponding monochromatic sub-pixel.

Figures 5, 6:
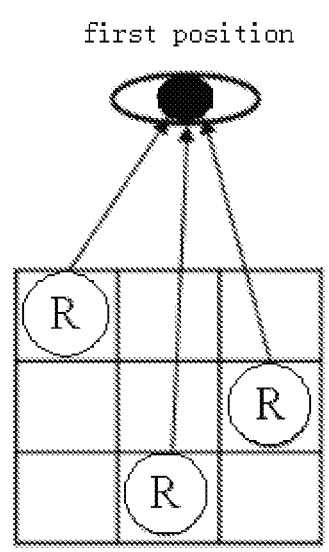
FIG. 5 is a structural diagram of a pixel unit in an embodiment of the present disclosure.
FIG. 6 is a schematic diagram of light path in a case where eyes of a viewer watch a 3D display device in an embodiment of the present disclosure from first viewing positions.

FIG. 5 is a structural diagram of a pixel unit in the embodiment. As shown in FIG. 5, the display panel includes a plurality of pixel units, and each pixel unit is provided corresponding to the lens in the lens unit 200, the pixel unit includes a pixel array of RGB/GBR/BRG, R represents a red sub-pixel, G represents a green sub-pixel and B represents a blue sub-pixel. In the embodiment, each liquid crystal lens corresponds to one pixel unit of RGB/GBR/BRG. The adjusting component includes a first adjusting element, a second adjusting element and a third adjusting element, the first adjusting element is configured to adjust the gray scale voltage of a red sub-pixel according to the current positions so that the display information of the red sub-pixel received by the eyes of the viewer at the current positions is the same as the display information of the red sub-pixel received by the eyes of the viewer at the preset positions, the second adjusting element is configured to adjust the gray scale voltage of a green sub-pixel according to the current positions so that the display information of the green sub-pixel received by the eyes of the viewer at the current positions is the same as the display information of the green sub-pixel received by the eyes of the viewer at the preset positions, the third adjusting element is configured to adjust the gray scale voltage of a blue sub-pixel according to the current positions so that the display information of the blue sub-pixel received by the eyes of the viewer at the current positions is the same as the display information of the blue sub-pixel received by the eyes of the viewer at the preset positions.

In the embodiment, similar to the fact that the adjusting component can be implemented by a driving circuit, the first adjusting element can be implemented by a first driving sub-circuit, the second adjusting element can be implemented by a second driving sub-circuit, and the third adjusting element can be implemented by a third driving sub-circuit. Each driving sub-circuit is configured to apply a corresponding gray scale voltage to sub-pixels of each color, so that the display information received by the eyes of the viewer at the current positions is the same as the display information received by the eyes of the viewer at the preset positions.

Figure 7:
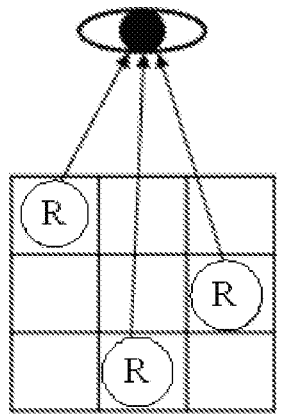
FIG. 7 is a schematic diagram of light path in a case where eyes of a viewer watch a 3D display device in an embodiment of the present disclosure from second viewing positions.

Detailed descriptions are given below by taking a red sub-pixel as example. FIG. 6 is a schematic diagram of light path in a case where the eyes of the viewer watch the 3D display device in the embodiment from first viewing positions. As shown in FIG. 6, a single pixel unit includes three red sub-pixels R, and the display information received by the eye of the viewer at the first position is X. FIG. 7 is a schematic diagram of light path in a case where the eyes of the viewer watch the 3D display device in the embodiment from second viewing positions. As shown in FIG. 7, in a case where the eye of the viewer is at the second position, in order to keep the display information received by the eye of the viewer as X, the gray scale voltage of the three red sub-pixels R in the case where the eye of the viewer is at the second position is directly used, so that the display information received by the eye of the viewer at the second position is till X. Herein, the correspondence relationship among the second position of the eye of the viewer, the gray scale voltages of the three red sub-pixels R and the display information X received by the eye of the viewer is pre-detected and pre-stored. That is to say, in the embodiment, the correspondence relationship among the second position of the eye of the viewer, the gray scale voltages of the three red sub-pixels R and the display information X received by the eye of the viewer is pre-detected and pre-stored, and then the corresponding gray scale voltage is used according to the display information X received by the eye of the viewer and the second position, so that the gray scale voltage is adjusted, which ensures that the display information of the monochromatic sub-pixel received by the eye of the viewer at the second position is the same as the display information of the monochromatic sub-pixel received by the eye of the viewer at the first position.

The 3D display device of the embodiment includes the display panel, the lens unit, the acquiring component and the adjusting component, the lens unit is provided on the light exiting surface of the display panel, the lens unit is configured to form the left eye parallax image corresponding to the left eye and the right eye parallax image corresponding to the right eye, the acquiring component is configured to acquire the current positions of the eyes of the viewer, the adjusting component is configured to adjust the signal for driving the display panel according to the current positions so that the display information of the display panel received by the eyes of the viewer at the current positions is the same as the display information of the display panel received by the eyes of the viewer at the preset positions. With the technical solution of the embodiment, it is not required to change the morphology of the lens, and the positions of the eyes of the viewer are acquired, then the signal for driving the display panel is adjusted according to the positions of the eyes of the viewer so that the display information of the display panel received by the eyes of the viewer at the current positions is the same as the display information of the display panel received by the eyes of the viewer at the optimal positions, and finally the viewer can see a continuous and smooth naked-eye 3D picture even during moving of the eyes of the viewer, resulting in improved visual experiences.

Figure 8:
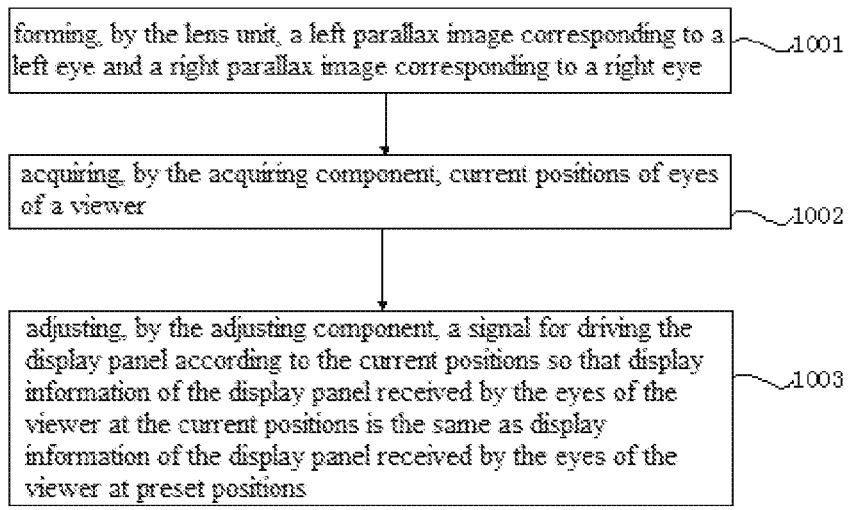
FIG. 8 is a flowchart of a working method of a 3D display device in an embodiment of the present disclosure.

FIG. 8 is a flowchart of a working method of a 3D display device in an embodiment of the present disclosure. As shown in FIG. 8, the 3D display device includes a display panel, a lens unit, an acquiring component and an adjusting component, the lens unit is provided on a light exiting surface of the display panel.

The working method of the 3D display device includes steps of: S1001, forming, by the lens unit, a left eye parallax image corresponding to a left eye and a right eye parallax image corresponding to a right eye; S1002, acquiring, by the acquiring component, current positions of eyes of a viewer; and S1003, adjusting, by the adjusting component, a signal for driving the display panel according to the current positions so that display information of the display panel received by the eyes of the viewer at the current positions is the same as display information of the display panel received by the eyes of the viewer at preset positions.

In the embodiment, the display information includes gray scale information, the adjusting component adjusts a gray scale voltage of a monochromatic sub-pixel according to the current positions so that the display information of the monochromatic sub-pixel received by the eyes of the viewer at the current positions is the same as the display information of the monochromatic sub-pixel received by the eyes of the viewer at the preset positions. With the technical solution of the embodiment, it is not required to change the morphology of the lens, and the positions of the eyes of the viewer are acquired, then the signal for driving the display panel is adjusted according to the positions of the eyes of the viewer so that the display information of the display panel received by the eyes of the viewer at the current positions is the same as the display information of the display panel received by the eyes of the viewer at the optimal positions, and finally the viewer can see a continuous and smooth naked-eye 3D picture even during moving of the eyes of the viewer, resulting in improved visual experiences.

Figure 9:
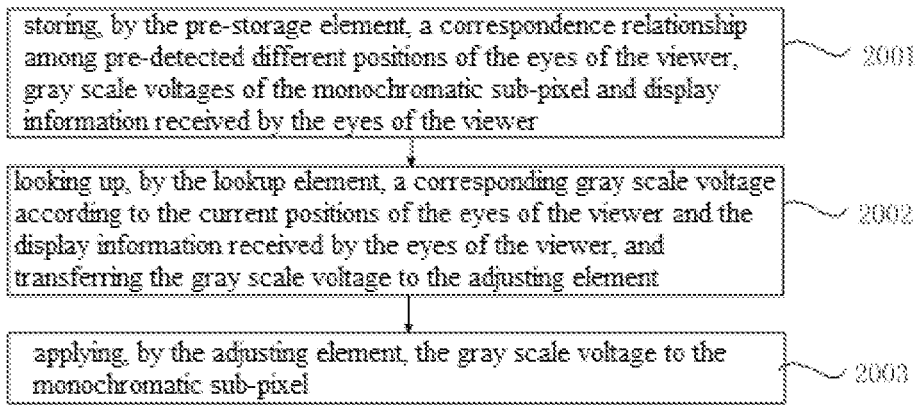
FIG. 9 is a flowchart of a working method of a 3D display device in an embodiment of the present disclosure.

Referring to FIG. 4, the adjusting component includes a pre-storage element 403, a lookup element 402 and an adjusting element 401, the step of adjusting, by the adjusting component 400, the gray scale voltage of the monochromatic sub-pixel according to the current positions includes steps of: S2001, storing, by the pre-storage element 403, a correspondence relationship among pre-detected different positions of the eyes of the viewer, gray scale voltages of the monochromatic sub-pixel and display information received by the eyes of the viewer; S2002, looking up, by the lookup element 402, a corresponding gray scale voltage according to the current positions of the eyes of the viewer and the display information received by the eyes of the viewer, and transferring the gray scale voltage to the adjusting element; S2003, applying, by the adjusting element 401, the gray scale voltage to the monochromatic sub-pixel. Specifically, FIG. 9 is a flowchart of a working method of a 3D display device in an embodiment of the present disclosure. Thus, in the embodiment, the positions of the eyes of the viewer, the gray scale voltage of the monochromatic sub-pixel and the display information received by the eyes of the viewer are pre-detected so that the correspondence relationship among them is established, and the pre-storage component 403 stores the correspondence relationship. In a case where the positions of the eyes of the viewer are detected in real time, the lookup element 402 looks up the corresponding gray scale voltage according to the positions of the eyes of the viewer and the display information received by the eyes of the viewer, and the adjusting element 401 applies the gray scale voltage to the monochromatic sub-pixel so as to realize the function of the adjusting component 400, thereby it is ensured that the display information of the monochromatic sub-pixel received by the eyes of the viewer at the current positions is the same as the display information of the monochromatic sub-pixel received by the eyes of the viewer at previous positions.

Referring to FIG. 5, each liquid crystal lens corresponds to one pixel unit of RGB/GBR/BRG, and FIG. 5 shows four identical pixel units. The adjusting component includes a first adjusting element, a second adjusting element and a third adjusting element, the first adjusting element is configured to adjust the gray scale voltage of a red sub-pixel according to the current positions so that the display information of the red sub-pixel received by the eyes of the viewer at the current positions is the same as the display information of the red sub-pixel received by the eyes of the viewer at the preset positions, the second adjusting element is configured to adjust the gray scale voltage of a green sub-pixel according to the current positions so that the display information of the green sub-pixel received by the eyes of the viewer at the current positions is the same as the display information of the green sub-pixel received by the eyes of the viewer at the preset positions, the third adjusting element is configured to adjust the gray scale voltage of a blue sub-pixel according to the current positions so that the display information of the blue sub-pixel received by the eyes of the viewer at the current positions is the same as the display information of the blue sub-pixel received by the eyes of the viewer at the preset positions. Detailed descriptions are given below by taking a red sub-pixel as example.

Referring to FIG. 6, a single pixel unit includes three red sub-pixels R, and the display information received by the eye of the viewer at the first position is X. In a case where the eye of the viewer is at the second position, in order to keep the display information received by the eye of the viewer as X, the gray scale voltage of the three red sub-pixels R in the case where the eye of the viewer is at the second position is directly used, so that the display information received by the eye of the viewer at the second position is till X. Herein, the correspondence relationship among the second position of the eye of the viewer, the gray scale voltages of the three red sub-pixels R and the display information X received by the eye of the viewer is pre-detected and pre-stored. That is to say, in the embodiment, the correspondence relationship among the second position of the eye of the viewer, the gray scale voltages of the three red sub-pixels R and the display information X received by the eye of the viewer is pre-detected and pre-stored, and then the corresponding gray scale voltage is used according to the display information X received by the eye of the viewer and the second position, so that the gray scale voltage is adjusted, which ensures that the display information of the monochromatic sub-pixel received by the eye of the viewer at the second position is the same as the display information of the monochromatic sub-pixel received by the eye of the viewer at the first position.

In the working method of the 3D display device of the embodiment, the 3D display device includes the display panel, the lens unit, the acquiring component and the adjusting component, the lens unit is provided on the light exiting surface of the display panel, the lens unit is configured to form the left eye parallax image corresponding to the left eye and the right eye parallax image corresponding to the right eye, the acquiring component is configured to acquire the current positions of the eyes of the viewer, the adjusting component is configured to adjust the signal for driving the display panel according to the current positions so that the display information of the display panel received by the eyes of the viewer at the current positions is the same as the display information of the display panel received by the eyes of the viewer at the preset positions. With the technical solution of the embodiment, it is not required to change the morphology of the lens, and the positions of the eyes of the viewer are acquired, then the signal for driving the display panel is adjusted according to the positions of the eyes of the viewer so that the display information of the display panel received by the eyes of the viewer at the current positions is the same as the display information of the display panel received by the eyes of the viewer at the optimal positions, and finally the viewer can see a continuous and smooth naked-eye 3D picture even during moving of the eyes of the viewer, resulting in improved visual experiences.

With the 3D display device and the working method of the 3D display device provided by the present disclosure, a problem that, in a case where the eyes of the viewer deviate from the optimal viewing positions, the viewer will see significant picture flutter and visual experiences provided by the naked-eye 3D display device is affected seriously, is at least partially solved.

It should be understood that, the foregoing embodiments are only exemplary embodiments used for explaining the principle of the present disclosure, but the present disclosure is not limited thereto. Various variations and improvements may be made by a person skilled in the art without departing from the spirit and essence of the present disclosure, and these variations and improvements also fall into the protection scope of the present disclosure.

The invention claimed is:

1. A 3D display device, comprising a display panel, a lens unit, an acquiring component and an adjusting component, wherein the lens unit is provided on a light exiting surface of the display panel, the acquiring component is coupled between the adjusting component and the lens unit, the adjusting component is coupled to the display panel;

the lens unit is configured to form a left eye parallax image corresponding to a left eye and a right eye parallax image corresponding to a right eye;

the acquiring component is configured to acquire current positions of eyes of a viewer; and the adjusting component is configured to adjust a signal for driving the display panel according to the current positions so that display information of the display panel received by the eyes of the viewer at the current positions is the same as display information of the display panel received by the eyes of the viewer at preset positions, and wherein, the adjusting component is further configured to adjust a gray scale voltage of a monochromatic sub-pixel according to the current positions, so that display information of the monochromatic sub-pixel received by the eyes of the viewer at the current positions is the same as display information of the monochromatic sub-pixel received by the eyes of the viewer at the preset positions, the adjusting component includes a first adjusting element, a second adjusting element and a third adjusting element, the first adjusting element is configured to adjust the gray scale voltage of a red sub-pixel according to the current positions so that the display information of the red sub-pixel received by the eyes of the viewer at the current positions is the same as the display information of the red sub-pixel received by the eyes of the viewer at the preset positions;

the second adjusting element is configured to adjust the gray scale voltage of a green sub-pixel according to the current positions so that the display information of the green sub-pixel received by the eyes of the viewer at the current positions is the same as the display information of the green sub-pixel received by the eyes of the viewer at the preset positions;

the third adjusting element is configured to adjust the gray scale voltage of a blue sub-pixel according to the current positions so that the display information of the blue sub-pixel received by the eyes of the viewer at the current positions is the same as the display information of the blue sub-pixel received by the eyes of the viewer at the preset positions, and the display information includes gray scale information.

2. The 3D display device of claim 1, wherein the adjusting component includes a pre-storage element, a lookup element and an adjusting element;

the pre-storage element is configured to store a correspondence relationship among pre-detected different positions of the eyes of the viewer, gray scale voltages of the monochromatic sub-pixel and display information received by the eyes of the viewer;

the lookup element is configured to look up a corresponding gray scale voltage according to the current positions of the eyes of the viewer and the display information received by the eyes of the viewer, and transfer the corresponding gray scale voltage to the adjusting element; and the adjusting element is configured to apply the corresponding gray scale voltage to the monochromatic sub-pixel.

3. The 3D display device of claim 1, wherein the lens unit includes any of a liquid crystal lens, a fixed lens and a lens film.

4. The 3D display device of claim 1, wherein the acquiring component includes a position detector, and the adjusting component includes a signal processor.

5. A working method of a 3D display device, wherein the 3D display device includes a display panel, a lens unit, an acquiring component and an adjusting component, the lens unit is provided on a light exiting surface of the display panel, the acquiring component is coupled between the adjusting component and the lens unit, and the adjusting component is coupled to the display panel, the working method of the 3D display device including steps of:

forming, by the lens unit, a left eye parallax image corresponding to a left eye and a right eye parallax image corresponding to a right eye;

acquiring, by the acquiring component, current positions of eyes of a viewer; and adjusting, by the adjusting component, a signal for driving the display panel according to the current positions so that display information of the display panel received by the eyes of the viewer at the current positions is the same as display information of the display panel received by the eyes of the viewer at preset positions, wherein the display information includes gray scale information, and wherein the step of adjusting, by the adjusting component, the signal for driving the display panel according to the current positions include a step of:

adjusting, by the adjusting component, a gray scale voltage of a monochromatic sub-pixel according to the current positions so that display information of the monochromatic sub-pixel received by the eyes of the viewer at the current positions is the same display information of the monochromatic sub-pixel received by the eyes of the viewer at the preset positions, the adjusting component includes a first adjusting element, a second adjusting element and a third adjusting element, the step of adjusting, by the adjusting component, the gray scale voltage of the monochromatic sub-pixel according to the current positions includes;

adjusting, by the first adjusting element, the gray scale voltage of a red sub-pixel according to the current positions so that the display information of the red sub-pixel received by the eyes of the viewer at the current positions is the same as the display information of the red sub-pixel received by the eyes of the viewer at the preset positions;

adjusting, by the second adjusting element, the gray scale voltage of a green sub-pixel according to the current positions so that the display information of the green sub-pixel received by the eyes of the viewer at the current positions is the same as the display information of the green sub-pixel received by the eyes of the viewer at the preset positions; and adjusting, by the third adjusting element, the gray scale voltage of a blue sub-pixel according to the current positions so that the display information of the blue sub-pixel received by the eyes of the viewer at the current positions is the same as the display information of the blue sub-pixel received by the eyes of the viewer at the preset positions.

6. The working method of the 3D display device of claim 5, wherein the adjusting component includes a pre-storage element, a lookup element and an adjusting element, the step of adjusting, by the adjusting component, the gray scale voltage of the monochromatic sub-pixel according to the current positions includes:

storing, by the pre-storage element, a correspondence relationship among pre-detected different positions of the eyes of the viewer, gray scale voltages of the monochromatic sub-pixel and display information received by the eyes of the viewer;

looking up, by the lookup element, a corresponding gray scale voltage according to the current positions of the eyes of the viewer and the display information received by the eyes of the viewer, and transferring the gray scale voltage to the adjusting element; and applying, by the adjusting element, the gray scale voltage to the monochromatic sub-pixel.

* * * * *